United States Patent
Gordt

(10) Patent No.: US 11,298,624 B2
(45) Date of Patent: Apr. 12, 2022

(54) FAIRGROUND RIDE, IN PARTICULAR ROLLER COASTER, AND METHOD AND COMPUTER PROGRAM FOR OPERATING A FAIRGROUND RIDE OF THIS TYPE

(71) Applicant: VR COASTER GMBH & CO. KG, Kaiserslautern (DE)

(72) Inventor: Dennis Gordt, Sextau (DE)

(73) Assignee: VR COASTER GMBH & CO. KG, Kaiserslautern (DE)

(*) Notice: Subject to any disclaimer, the term of this patent is extended or adjusted under 35 U.S.C. 154(b) by 58 days.

(21) Appl. No.: 16/762,062

(22) PCT Filed: Sep. 3, 2018

(86) PCT No.: PCT/EP2018/073642
§ 371 (c)(1),
(2) Date: May 6, 2020

(87) PCT Pub. No.: WO2019/091620
PCT Pub. Date: May 16, 2019

(65) Prior Publication Data
US 2020/0261812 A1    Aug. 20, 2020

(30) Foreign Application Priority Data
Nov. 7, 2017   (EP) .................................... 17200434

(51) Int. Cl.
*A63G 31/16*   (2006.01)
*A63G 7/00*    (2006.01)
(Continued)

(52) U.S. Cl.
CPC .............. *A63G 31/16* (2013.01); *A63G 7/00* (2013.01); *G06F 3/011* (2013.01); *G06T 11/00* (2013.01)

(58) Field of Classification Search
CPC .......... A63G 7/00; A63G 27/00; A63G 27/02; A63G 31/00; A63G 31/16
(Continued)

(56) References Cited

U.S. PATENT DOCUMENTS

2012/0071251 A1* 3/2012 Crawford ............... A63G 27/02
472/45
2016/0048203 A1  2/2016 Blum et al.

FOREIGN PATENT DOCUMENTS

| DE | 102014111386 A1 | 2/2016 |
| WO | 098/51385 A1 | 11/1998 |
| WO | 2017/153532 A1 | 9/2017 |

OTHER PUBLICATIONS

Extended European Search Report dated Apr. 25, 2018, in corresponding EP patent application No. 17200434.3.

* cited by examiner

*Primary Examiner* — Kien T Nguyen
(74) *Attorney, Agent, or Firm* — Nath, Goldberg & Meyer; Jerald L. Meyer

(57) ABSTRACT

A fairground ride includes a first section which includes a travel route on which at least one vehicle is movably arranged. The vehicle is designed for accommodating at least one passenger. The fairground ride also includes a second section within which the passenger can move freely, a third section which connects the first section to the second section and in which the passenger can enter the vehicle and can exit from the vehicle, and a VR apparatus for generating and depicting a virtual reality. The virtual reality corresponds to a journey of the passenger with the vehicle along the travel route in the first section, to the position and movement of the passenger in the second section and to the entry and/or the exit of the passenger in the third section.

(Continued)

The virtual reality can be depicted on a head-mounted display assigned to the passenger.

10 Claims, 1 Drawing Sheet

(51) Int. Cl.
*G06F 3/01* (2006.01)
*G06T 11/00* (2006.01)
(58) Field of Classification Search
USPC .......................................... 472/43–48, 59–60
See application file for complete search history.

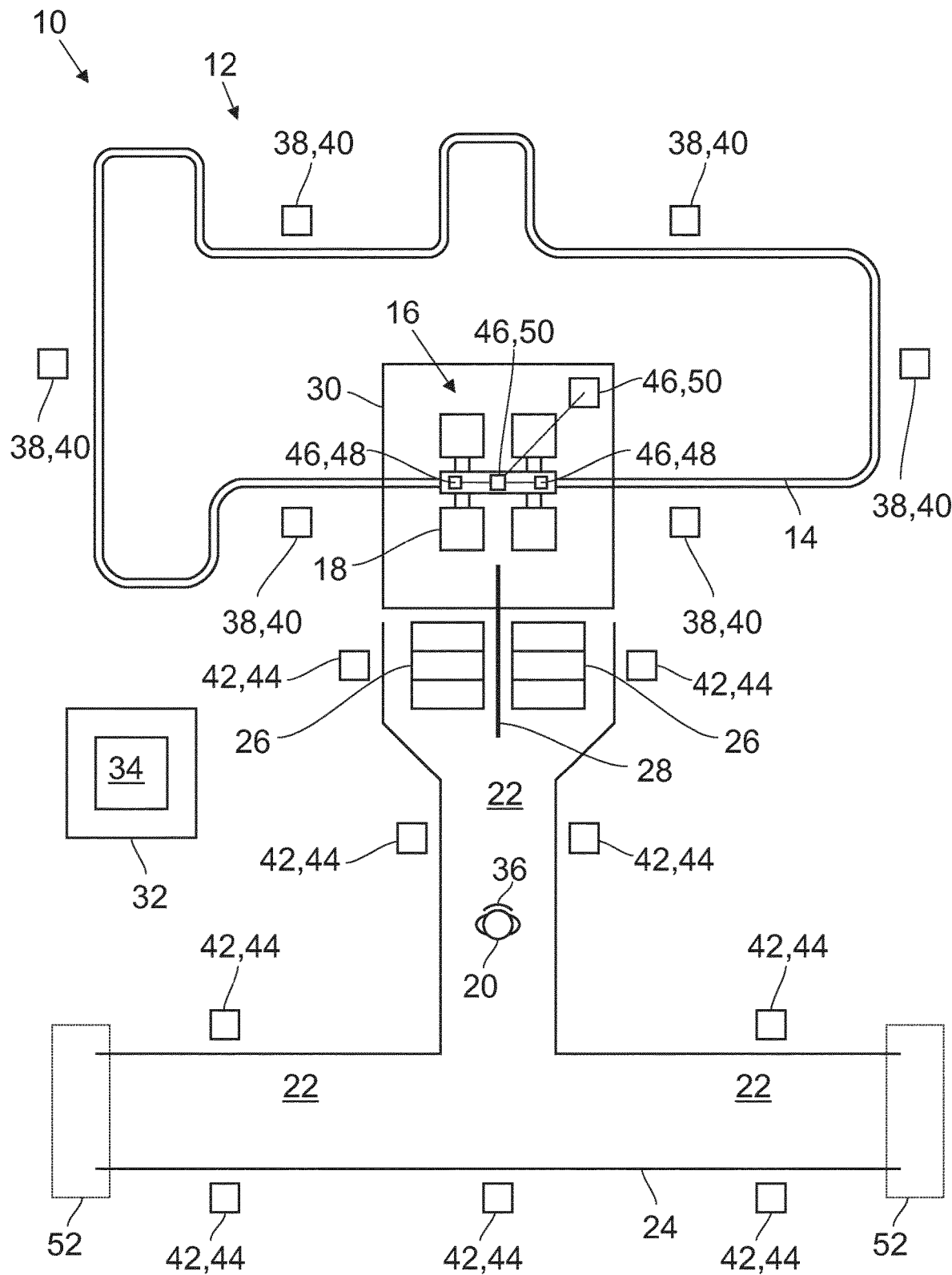

FAIRGROUND RIDE, IN PARTICULAR ROLLER COASTER, AND METHOD AND COMPUTER PROGRAM FOR OPERATING A FAIRGROUND RIDE OF THIS TYPE

This is a National Phase Application filed under 35 U.S.C. 371 as a national stage of PCT/EP2018/073642, filed Sep. 3, 2018, an application claiming the benefit of European Application No. 17200434.3 filed Nov. 7, 2017, the content of each of which is hereby incorporated by reference in its entirety.

The present invention relates to a fairground ride, in particular a roller coaster. The invention further relates to a method and a computer program for operating such a fairground ride.

In particular due to the increasing processor performance of computers and the increasing amount of data that can be transmitted wirelessly, the concept of virtual reality (VR) can be transferred to more and more areas of application. A special area of application to be emphasized is fairground rides, which make it possible to combine movements that take place in virtual reality with real movements in a particularly extensive manner, which results in a particularly extensive immersion and a correspondingly intense driving experience for the passenger. Such fairground rides are known, for example, from EP 2 138 213 B1, JP 2001 062 154 A, U.S. Pat. No. 6,179,619 B1 and EP 3 041 591 B1.

In order to make virtual reality accessible to the passenger, head-mounted displays such as VR glasses are typically used. The head-mounted displays are usually issued by the fairground rides to the passengers before the journey begins and then collected again. The issuance and collection of the head-mounted displays takes place in a station in the fairground ride, in which the passengers enter the vehicle and exit from the vehicle. As a result, the head-mounted displays are issued and collected in the immediate vicinity of the vehicles. After the passengers have entered the vehicle, the head-mounted displays must be synchronized so that the virtual reality coincides with the current position of the passenger. The issuance, collection and synchronization of the head-mounted displays take a relatively long time, which delays the operating sequence. In the event that one of the issued head-mounted displays does not work, the passenger in question usually only notices this after he has already taken a seat in the vehicle, since the head-mounted display could not be put on beforehand due to the entry process. An exchange for another head-mounted display therefore inevitably leads to an operating delay. Operating delays result in reduced throughput, which has a negative impact on the profitability of the fairground ride in question.

In addition, it is necessary that the depiction in the respective head-mounted displays is always different, specifically adapted to the position of the vehicle used in the fairground ride and also to the position of the seat within this vehicle. This represents a further challenge to the operation of the fairground ride, since, for this purpose, either head-mounted displays, which have been configured differently, prepared for each vehicle or seat, must be used and differentiated, or they must determine their position using an additional system, which is either a burden on the throughput or the technical complexity of the installation and thus also reduces the profitability.

Another limitation of the use of head-mounted displays on a fairground ride is that the experience of the passengers is limited to the movement of the fairground ride only and no free movement within the simulated virtual reality outside the vehicle is possible. The surrounding real world gets therefore always left out and cannot be entered.

At the same time, it has not been possible thus far to integrate a seamless transition to a dynamic driving experience of a fairground ride in a freely accessible virtual reality. Such a freely accessible VR experience is therefore always limited to walking around or touching objects, but does not allow the experience of increased G-forces or weightlessness, which can only be achieved with a larger fairground ride that carries out space-consuming movements.

The object of one embodiment of the present invention is to provide a fairground ride of the abovementioned type, in which the delays in the operating sequence can be reduced, so that the fairground ride can be operated with an increased throughput. In addition, the object is to expand the freedom of movement of the passengers beyond the specified movements of a fairground ride. Furthermore, it is the object of one embodiment of the present invention to create a method with which the fairground ride can be operated accordingly. In addition, it is the object of one embodiment of the invention to provide a computer program product for operating the fairground ride and/or for carrying out this method.

This object is achieved with the features specified in claims 1, 5 and 8. Advantageous embodiments are the subject of the dependent claims.

One embodiment of the invention relates to a fairground ride, in particular a roller coaster, comprising a first section which comprises a travel route on which at least one vehicle is movably arranged, wherein the vehicle is designed for accommodating at least one passenger, a second section within which the passenger can move freely, a third section which connects the first section to the second section and in which the passenger can enter the vehicle and can exit from the vehicle, and a VR apparatus for generating and depicting a virtual reality, with which a virtual reality corresponding to a journey of the passenger with the vehicle along the travel route in the first section, a virtual reality corresponding to the position and movement of the passenger in the second section, and a virtual reality corresponding to the entry and/or the exit of the passenger in the third section can be generated and can be depicted on a head-mounted display assigned to the passenger depending on the position and the movement of the passenger on the fairground ride. To this end, the VR apparatus has a first position detection device for detecting the position of the vehicle on the travel route, a second position detection device for detecting the position and movement of the passenger in the second and third section, and a third position detection device for detecting the stopping position of the vehicle in the third section.

The fairground ride according to the proposal has a first section in which the track is located, a second section in which the passenger can move freely, and a third section which connects the first section to the second section and in which the passenger can enter the vehicle and can exit from the vehicle. The term "move freely" should be understood to mean that the passenger can move freely within the limits and obstacles predefined by the second section. The second section may be bounded by walls and may have obstacles, such as railings and stairs, which impose certain restrictions on the freedom of movement of the passenger. However, these restrictions do not go beyond those that exist in the real world. However, as long as he is in the vehicle and consequently in the first section, he is no longer free to decide about his movements, since he is secured in the vehicle with a restraint apparatus and cannot leave the vehicle as long as the restraint apparatus is in the closed position.

As already mentioned, the first section is predefined by the travel route, while the second section is outside the first section. To this end, the third section connects the first section and the second section and can also be viewed as an overlap area of the first section and the second section. In the third area, the switching from the second area to the first area and vice versa is made possible. For example, with roller coasters, this is the case in the station. However, since passengers can also move freely within the station within certain limits, the delimitation between the three sections cannot always be clearly defined, so that there may also be overlaps. However, there are also fairground rides in which there is no such station, for example, when the fairground ride does not have a travel route in the form of a track system, but rather a rotating platform or suspension to which the vehicles are attached. In this case, the third section is the immediate vicinity of the stationary vehicle.

The virtual reality is shown to the passenger in all three sections. Consequently, the virtual reality extends not only to the travel route, as is the case in the fairground rides disclosed in EP 2 138 213 B1, JP 2001 062 154 A, U.S. Pat. No. 6,179,619 B1 and EP 3 041 591 B1. Rather, the second section in particular is integrated in the virtual reality. The second position detection apparatus is configured such that it can detect the position and movement of the passenger in the second and third section and transmit it to the VR apparatus.

The issuance and collection of the head-mounted displays can therefore take place at a considerable spatial distance from the third section in which the passengers enter and exit from the vehicles. Since, depending on the size of the second section, the passenger has to travel a more or less large distance to the third section, the issuance and collection of the head-mounted displays can also be carried out separately from entering and exiting. The head-mounted displays can be synchronized in an entrance area of the second section. In addition, faulty head-mounted displays can be replaced already in the entrance area. Due to the inclusion of the second section in the virtual reality, a buffer is created in relation to the passengers, whereby delays, in particular in the issuance of the head-mounted displays, do not lead to delays in the operating sequence of the vehicle.

Since the virtual reality is not only limited to driving the vehicle, but extends to the second section, the time in which the passenger is in the virtual reality increases. This reduces waiting times.

The passenger should not put down the head-mounted display when entering and exiting from the vehicle, so that the passenger must be able to enter and exit using the information provided by the virtual reality. This presupposes that a transition into the vehicle that matches the virtual reality is ensured. Obstacles such as steps, railings, walls or safety catches have to be depicted in virtual reality, at least in terms of their arrangement and dimensions, as they are in the real world, otherwise the passenger could stumble or get injured by these objects. To this end it is necessary that the stopping position of the vehicle in the third section, in which the passenger enters or exits, can be detected and determined very precisely. Therefore, the fairground ride according to the proposal has the third position detection device for detecting the stopping position of the vehicle in the third section, which is specially designed for this purpose. As with the fairground ride according to EP 3 041 591 B1, the fairground ride according to the proposal has the first position detection device for detecting the position of the vehicle on the travel route. It is used to synchronize the virtual reality with the vehicle to prevent latency, which can cause nausea and dizziness in the passenger. For this purpose, however, it is not necessary to determine the position of the vehicle on the route with very high accuracy. A deviation of ±20 cm is acceptable. However, such a deviation is not acceptable in the third section, since this can lead to the stumbling and/or striking of the vehicle or obstacles described above in the third section. According to the proposal, the third position detection device has a higher precision with regard to the position determination of the vehicle than the first position detection device. The third position detection device is only arranged in the third section, where the position and in particular the stopping position of the vehicle must be determined with increased accuracy. Since the increased measurement accuracy usually goes hand in hand with an increased data volume and with more expensive position sensors, these sensors are only used where they are essential. This keeps the data volume and costs within limits.

According to another embodiment, the third position detection device is configured in such a way that the stopping position of the vehicle can be detected with an accuracy of 20 mm to 0.1 mm and in particular 10 mm to 0.2 mm. It has been found that such accuracy enables smooth entry and exit. Since with increasing accuracy with which the third position detection device can be operated, the data quantities increase and higher-quality position sensors have to be used, this embodiment makes it possible to find a compromise here which provides sufficient accuracy with acceptable data volume and reasonably priced position sensors.

In a further developed embodiment, the third position detection device can comprise inductively and/or optically operating position sensors. With such position sensors, the required accuracy can be reliably achieved without the position sensors becoming too expensive.

In a further developed embodiment, the position sensors can be arranged on the vehicle and the vehicle can have a transmission apparatus for transmitting the position of the vehicle to the VR apparatus. The transmission apparatus can transmit the position of the vehicle wirelessly or via the travel route. There are advantages in particular when retrofitting existing fairground rides, since the operator of the fairground ride in the third section or in the station itself does not have to carry out any reconstruction measures. The third position sensors can be installed by the vehicle manufacturer as part of an inspection, so that downtimes during retrofitting are kept to a minimum. Retrofitting is less burdensome for the operator of the ride.

For example, the following measurement methods can be used. So-called "outside-in-tracking" can be used, in which the position sensor is separated and arranged outside of the head-mounted displays. For this purpose, markers can be attached to the moving objects, in this case to the head-mounted displays of the passengers. The position sensor can track the movement of the markers, as a result of which the position of the passenger in the fairground ride can be calculated and transmitted to the relevant head-mounted displays. Such markers can also be dispensed with. In this case, the position detection devices must identify objects, in this case the passenger, from the data of the position sensors, for example by means of a determination of the outline, which is continuously followed. These measurement methods are particularly suitable for the second and third section, so that the second and third position detection devices can be constructed in the same way and combined to form a position detection device.

In addition, so-called "inside-out trackings" can be used, in which the position sensor is arranged on the head-mounted display. Here, too, markers can be used to create orientation aids which are arranged firmly in the first, second or third section. An "inside-out-tracking" without the use of markers is also possible. In this case, a measurement method can be used within the entire fairground ride, so that the first, the second and the third position detection device are combined to form a single position detection device.

One embodiment of the invention relates to a method for operating a fairground ride, in particular a roller coaster, according to any one of the previous embodiments, comprising the following steps:
- detecting the position of the vehicle on the travel route by means of the first position detection device,
- detecting the position and movement of the passenger in the second and third section by means of the second position detection device,
- detecting the stopping position of the vehicle in the third section by means of the third position detection device,
- transmitting the detected positions, movement and stopping position to the VR apparatus, and
- generating and depicting a virtual reality with which a virtual reality corresponding to a journey of the passenger with the vehicle along the travel route in the first section, a virtual reality corresponding to the position and movement of the passenger in the second section and a virtual reality corresponding to the entry and/or the exit of the passenger in the third section can be generated and can be depicted on a head-mounted display assigned to the passenger depending on the position and the movement of the passenger on the fairground ride.

The technical effects and advantages that can be achieved with the method according to the proposal correspond to those that have been discussed for the present fairground ride. In summary, it should be pointed out that the virtual reality is extended to the second section, so that the head-mounted display can be put on and taken off at a distance in time and space from entering and exiting from the vehicle. As a result, operational delays due to buffering are avoided or significantly reduced. The throughput of the fairground ride can be increased. In addition, the time for which the passenger is in virtual reality can be extended. The use of a third position detection device enables the adaptation to the entering and exiting of passengers in and from the vehicle, so that the position sensors adapted thereon are only used here, as a result of which the costs and the amount of data transmitted are kept low.

In a further embodiment, the method can comprise the following step:
Detecting the stopping position of the vehicle with an accuracy of 20 mm to 0.1 mm by means of the third position detection device.

It has been found that such accuracy enables smooth entry and exit.

According to a further embodiment, the method comprises the following step: —defining a stopping position of the vehicle in the third section, and
moving the vehicle within the third section such that the vehicle occupies the stopping position with an accuracy of 20 mm to 0.1 mm.

As already mentioned, knowing the exact stopping position of the vehicle is of great importance for smooth entry and exit. If the vehicle comes to a stop with a more or less large deviation from a predetermined stopping position, the virtual reality must take this deviation into account in the depiction of the vehicle and the surrounding elements, such as safety catches and walls, which requires a certain programming and computing effort. However, if the vehicle comes to a stop with a deviation of a maximum of ±10 mm, the virtual reality can be designed in such a way that the stopping vehicle is always depicted in the same way, which is why the programming and computing effort involved can be kept low.

A further developed embodiment of the method comprises the following steps:
depicting the virtual reality in the first section, in the second section and/or in the third section by means of an environment depiction (real-time graphics) generated in real time, by means of a depiction of the virtual reality precalculated as a video sequence or by means of a virtual reality generated in real time but depicted in connection with precalculated elements.

In the case of pure real-time graphics, the virtual reality is calculated completely depending on the current position of the passenger, so that a relatively large computing effort is necessary. As a result, there are certain limits to the quality of the graphics used to display virtual reality. In the first section, the position of the passenger is essentially specified by the vehicle; the orientation of the head-mounted display alone cannot be predetermined. As a result, precalculated data sets, such as a spherical 360° video sequence, can be used in the calculation of the virtual reality in the first section, so that the virtual reality in the first section can be calculated without any appreciable loss in the quality of the graphics.

When using such a pre-calculated graphic sequence, the virtual reality is largely predefined and essentially only the movements of the head of the passenger are taken into account. In virtual realities created using pre-calculated graphics, immersion is generally not as great as in virtual realities created in real time.

In the case of a hybrid display, parts of the virtual reality are depicted in real time and other parts with a pre-calculated graphic. The precalculated parts of the virtual reality are mainly used for objects which are arranged in the background of the virtual reality and which are therefore perceived by the viewer with a lower parallax. As a result, the computing effort can be reduced without any significant loss in immersion. Elements that are in the foreground, i.e. very close to the passenger's observation point, can, however, be depicted in real-time graphics, which makes them appear more spatially convincing with always correct parallax during head movements. Interactive elements can also be integrated in the foreground using real-time graphic elements.

The use of precalculated graphics or a hybrid depiction for the virtual reality is particularly useful for the first section, since the passenger is in a known position and also in a known driving movement in this section.

Switching between a depiction of the virtual reality by means of real-time graphics and a pre-calculated graphic can be carried out based on the position of the user within the fairground ride.

One embodiment of the invention relates to a computer program for executing a method according to any one of the previously discussed embodiments and/or for operating an fairground ride, in particular a roller coaster, according to any one of the previously explained embodiments, in particular a roller coaster, the computer program comprising program means for causing the VR apparatus to execute the following steps when the computer program is executed on the VR apparatus:—detecting the position of the vehicle on the travel route by means of the first position detection device,
  detecting the position and movement of the passenger in the second and third section by means of the second position detection device,
  detecting the stopping position of the vehicle in the third section by means of the third position detection device,
  transmitting the detected positions, movement and stopping position to the VR apparatus, and
  generating and depicting a virtual reality with which a virtual reality corresponding to a journey of the passenger with the vehicle along the travel route in the first section, a virtual reality corresponding to the position and movement of the passenger in the second section and a virtual reality corresponding to the entry and/or the exit of the passenger in the third section is generated and depicted on a head-mounted display assigned to the passenger depending on the position and the movement of the passenger on the fairground ride.

The technical effects and advantages that can be achieved with the computer program according to the proposal correspond to those that have been discussed for the present fairground ride. In summary, it should be pointed out that the virtual reality is extended to the second section, so that the head-mounted display can be put on and taken off at a distance in time and space from entering and exiting from the vehicle. As a result, operational delays due to buffering are avoided or significantly reduced. The throughput of the fairground ride can be increased. In addition, the time for which the passenger is in virtual reality can be extended. The use of a third position detection device enables the adaptation to the entering and exiting of passengers in and from the vehicle, so that the position sensors adapted thereon are only used here, as a result of which the costs and the amount of data transmitted are kept low.

According to a further embodiment of the invention, the computer program executes the following steps:
  automatic switching of the position detection between the first position detection device, the second position detection device and the third position detection device depending on the position of the passenger and/or the speed of the vehicle, or
  switching the position detection between the first position detection device, the second position detection device and the third position detection device after confirmation by an employee of the fairground ride.

As already mentioned, it is particularly useful in the second and in the third section to use markers for the position detection of the passenger. Although the position of the passenger could also be detected in the first section using markers, in this case the first position detection device would have to be configured accordingly. However, since, as described, that of the passenger in the first section can be determined with sufficient accuracy by determining the position of the vehicle on the travel route, for which purpose route sensors are used, it is not necessary to equip the first position detection device with corresponding position sensors. However, it is then necessary to activate the corresponding sensors for determining the position. This can be done, for example, on the basis of the position determined itself and/or with the movement patterns detected. If the passenger is in the third section, the computer program knows that a switch between the position detection devices must be made. The computer program can take into account the movement pattern of the passenger in question. If the passenger has been in the second section in the time before reaching the third section, a switch must be made from the second position detection device to the first position detection device. If the passenger has been in the first section beforehand, a switch must be made from the first position detection device to the second position detection device.

Alternatively, the switch can also be carried out by an employee of the fairground ride. The computer program can then give a corresponding signal to the employee if it assumes that, for example, a switch is to be made from the second to the first position detection device. A button can light up, which the employee can confirm. This confirmation can also be used as an enable signal to set the vehicle in motion. The employee presses the button when all passengers are properly seated in the vehicle and secured with the safety catches. In this case, a safety query is also implemented when the switch from the second to the first position detection device is confirmed.

An exemplary embodiment of the invention is explained in more detail below with reference to the accompanying drawings.

FIG. 1 shows a schematic depiction of an embodiment of a fairground ride according to the invention.

FIG. 1 shows an exemplary embodiment of a fairground ride 10 according to the invention on the basis of a basic depiction. Ride 10 comprises a first section 12, which has a travel route 14 along which a vehicle 16 can be moved by means of drive means, not shown. Of course, the fairground ride 10 can have more than one vehicle 16. In the depicted embodiment, the fairground ride 10 is a roller coaster.

In the exemplary embodiment depicted, vehicle 16 has four passenger accommodation means 18, with each of which a passenger 20 can be accommodated in vehicle 16. The passenger accommodation means 18 have restraint devices, not shown, which can be moved between an open position and a closed position. In the closed position, the restraint apparatus secure the passengers 20 so that they cannot fall out of the vehicle 16 while driving. Consequently, the passenger 20 can move in the closed position only to a very limited extent and cannot leave the passenger accommodation means 18.

Furthermore, fairground ride 10 has a second section 22, which is located outside travel route 14 and is bounded by walls 24 in the exemplary embodiment depicted. In second section 22, passenger 20 can largely move freely, the second section 22 having obstacles such as stairs 26 and railings 28, which limit the freedom of movement of passenger 20, but to a significantly reduced extent compared to the restraint apparatus of the vehicle 16.

Furthermore, fairground ride 10 comprises a third section 30, which connects first section 12 to second section 22. In third section 30, the passengers 20 can enter vehicle 16 and exit from vehicle 16. Route 14 passes through third section 30. Third section 30 can also be referred to as a station.

Fairground ride 10 also has a VR apparatus 32 with which a virtual reality can be generated and depicted. For this purpose, VR apparatus 32 has a computing unit 34. VR apparatus 32 communicates wirelessly with at least one head-mounted display 36, which the passenger 20 wears comparable to glasses. Head-mounted display 36 depicted the virtual reality for passenger 20.

The position and movement of passenger 20 must correspond to those in the virtual reality so that the greatest possible immersion, that is to say an impression of the virtual reality which is perceived as real as possible, can be achieved. Therefore, VR apparatus 32 comprises a first position detection device 38 for detecting the position of vehicle 16 on travel route 14. As already mentioned above, passenger 20 can only move in vehicle 16 to a very limited extent, so that a relatively large immersion can already be achieved by determining the position of vehicle 16 on travel route 14. Travel route 14 is known, so that the virtual reality only has to be adapted to the position of vehicle 16. The movement of passenger 20 can be neglected. This does not rule out taking into account the movement of passenger 20 in vehicle 16 when generating the virtual reality, in particular the movement of the head of vehicle 16, as a result of which the immersion can be increased. The position of vehicle 16 on travel route 14 is detected by means of route sensors 40 and transmitted to computing unit 34, which takes into account the position of vehicle 16 on travel route 14 when generating the virtual reality.

Furthermore, VR apparatus 32 has a second position detection device 42 for detecting the position and movement of passenger 20 in second and third section 30. Second position detection device 42 comprises a plurality of motion sensors 44 arranged in second section 22. As already mentioned, passenger 20 can move largely freely in second section 22. This also applies to third section 30 as long as passenger 20 is not yet in passenger accommodation 18 and the restraint apparatus has not yet been placed in the closed position. Compared to first section 12, passenger 20 consequently has a significantly greater freedom of movement in second section 22 and, under the conditions mentioned, also in third section 30. In addition, the path that passenger 20 travels, in particular in second section 22, can only be predetermined to a limited extent. In this respect, the amounts of data generated by second position detection device 42 are larger than those generated by first position detection device 38. The position and the movement of passenger 20 in second and third sections 22, 30 are transmitted to computing unit 34, which takes into account the position and the movement of passenger 20 in second and third sections 22, 30 when generating the virtual reality.

In addition, VR apparatus 32 comprises third position detection device 46 for detecting the stopping position of vehicle 16 in third section 30. For this purpose, as will be explained in the following, third position detection device 46 comprises position sensors 48 which are clearly different from the route sensors 40 which detect the position of vehicle 16 on travel route 14. In the exemplary embodiment depicted, position sensors 48 are arranged on vehicle 16, the signals of which are transmitted to computing unit 34 by means of a transmission apparatus 50. The stopping position of vehicle 16 is also taken into account when generating the virtual reality. As a result, the virtual reality extends over all three sections 12, 22, 30 of fairground ride 10.

Fairground ride 10 is operated in the following way: In the exemplary embodiment depicted, second section 22 has two entrance areas 52. In one of these entrance areas 52, a head-mounted display 36 is handed over to passenger 20 by an employee of fairground ride 10 not shown, and who puts the head-mounted display 36 on. Head-mounted display 36 is then synchronized with computing unit 34 and checked for functionality. The synchronization has the effect that computing unit 34 now generates a virtual reality for this head-mounted display 36 and transmits it to head-mounted display 36, so that this virtual reality can be depicted to passenger 20. In the event that the relevant head-mounted display 36 should not function properly, the employee of fairground ride 10 exchanges it for another.

In the following, it should be assumed that virtual reality simulates an airport. The virtual reality simulates properties of second section 22 in a more or less alienated manner. Walls 24 of second section 22 can be simulated as fences for bounding an airfield or as walls 24 of a hangar. Passenger 20 is guided from the simulated fences or walls 24 through second section 22 and to third section 30. For this purpose, the virtual reality can display corresponding signposts to passenger 20. As already mentioned, second section 22 has stairs 26 which have to be climbed in order to reach third section 30. Stairs 26 and railing 28 can also be simulated by the virtual world as stairs 26 and railings 28, which lean against an aircraft and can be used to enter the cockpit of the aircraft. The cockpit is located in passenger accommodation 18 of vehicle 16 in the real world.

In order not to interrupt the immersion, passenger 20 keeps the head-mounted display 36 on even when entering. The virtual reality must be depict so accurately that passenger 20 can enter passenger accommodation 18 without stumbling and bumping into objects of vehicle 16, for example the restraint apparatus. To this end, it is necessary that the virtual reality coincides exactly with the real world. This presupposes that the stopping position of vehicle 16 can be determined very accurately. Even small deviations between the virtual reality and the real world could lead to accidents when entering or exiting, for example, by stumbling, as mentioned. Fairground ride 10 according to the invention therefore has position sensors 48, which can determine the stopping position of vehicle 16 in third section 30 very accurately, with an accuracy of at least 10 mm being aimed for. The position sensors 48 therefore differ from the route sensors 40, which determine the position of vehicle 16 on travel route 14. Route sensors 40 can be designed, for example, as light barriers, the position of which along the route is known. The light barrier only reports the time at which vehicle 16 broke through the light barrier. This information is used for balancing the position of vehicle 16 on the route and the virtual reality in order to keep the latency as low as possible. It is sufficient, for example, to arrange a route sensor along the route every 10 m.

Depending on the configuration, it is not possible with the route sensors 40 to determine the stopping position of vehicle 16 in the third section 30 with sufficient accuracy. Therefore, position sensors 48 are configured for a significantly higher precision in order to be able to determine the stopping position of vehicle 16 in third section 30 accurately enough. For this purpose, position sensors 48 can operate inductively or use lasers.

It is also possible to move vehicle 16 into a predetermined stopping position with the appropriate precision using the signals from position sensors 48 within third section 30.

It is also possible to configure first position detection device 38, second position detection device 42 and third position detection device 46 in the same way and to combine them into a single position detection device. For example, "inside-out tracking" is suitable for this purpose, in which position sensors 48 are arranged on head-mounted display 36. In order to keep the data volume within limits, position sensors 48 can work with a higher accuracy when the user is in third section 30, while the accuracy and thus the data volume can be reduced if the user is in first section 12 or in second section 22.

As soon as passenger 20 has entered passenger accommodation 18, the restraint apparatus is put into the closed position and then vehicle 16 is moved along travel route 14 through first section 12. In the virtual reality, the aircraft takes off and lands again when vehicle 16 approaches and drives into third section 30. The passenger 20 exits from vehicle 16 in a manner corresponding to that described for entry. Passenger 20 then leaves third section 30 and goes through second section 22 back to entrance area 52, where he puts down the head-mounted display 36 and leaves fairground ride 10.

In the exemplary embodiment depicted, third section 30 is only accessible from one side of travel route 14, so that passenger 20 has to leave third section 30 via the same route via which he entered third section 30. Of course, another second section 22 can be provided, which, for example, adjoins third section 30 on the opposite side of travel route 14. It is thus possible to use one of two second sections 22 only for entering third section 30 and the other of two sections 22 only for leaving third section 30, which simplifies the operation of fairground ride 10.

LIST OF REFERENCE NUMERALS 10 fairground ride
12 first section
14 travel route
16 vehicle
18 passenger accommodation
20 passenger
22 second part
24 walls
26 stairway
28 railing
30 third section
32 VR apparatus
34 computing apparatus
36 head-mounted display
38 first position detection device
40 route sensor
42 second position detection device
44 motion sensor
46 third position detection device
48 position sensor
50 transmission apparatus
52 entrance area

The invention claimed is:

1. A fairground ride, comprising:
a first section (12) which comprises a travel route (14) on which at least one vehicle (16) is movably arranged, wherein the vehicle (16) is adapted for accommodating at least one passenger (20);
a second section (22) within which the passenger (20) can move freely, wherein the second section (22) is outside of travel route (14);
a third section (30) which connects the first section (12) to the second section (22) and in which the passenger (20) can enter the vehicle (16) and can exit from the vehicle (16); and
a virtual reality (VR) apparatus (32) for generating and depicting a virtual reality, with which a virtual reality corresponding to a journey of the passenger (20) with the vehicle (16) along the travel route (14) in the first section (12), a virtual reality corresponding to the position and movement of the passenger (20) in the second section (22), and a virtual reality corresponding to the entry and/or the exit of the passenger (20) in the third section (30) can be generated and can be depicted on a head-mounted display assigned to the passenger (20) depending on the position and the movement of the passenger (20) on the fairground ride, wherein the VR apparatus (32) comprises:
a first position detection device (38) for detecting the position of the vehicle (16) on the travel route (14);
a second position detection device (42) for detecting the position and movement of the passenger (20) in the second and third section (30); and
a third position detection device (46) for detecting the stopping position of the vehicle (16) in the third section (30).

2. The fairground ride according to claim 1, wherein the third position detection device (46) is configured such that the stopping position of the vehicle (16) can be detected with an accuracy of 20 mm to 0.1 mm.

3. The fairground ride according to claim 1, wherein the third position detection device (46) comprises inductively and/or optically operating position sensors (48).

4. The fairground ride according to claim 3, wherein the position sensors (48) are arranged on the vehicle (16) and the vehicle (16) has a transmission apparatus (50) for transmitting the position of the vehicle (16) to the VR apparatus (32).

5. A method for operating the fairground ride according to claim 1, comprising the following steps:
detecting the position of the vehicle (16) on the travel route (14) by means of the first position detection device (38);
detecting the position and movement of the passenger (20) in the second and third section (30) by means of the second position detection device (42);
detecting the stopping position of the vehicle (16) in the third section (30) by means of the third position detection device (46);
transmitting the detected positions, movement and stopping position to the VR apparatus (32); and
generating and depicting the virtual reality corresponding to a journey of the passenger (20) with the vehicle (16) along the travel route (14) in the first section (12), the virtual reality corresponding to the position and movement of the passenger (20) in the second section (22) and the virtual reality corresponding to the entry and/or the exit of the passenger (20) in the third section (30) on the head-mounted display assigned to the passenger (20) depending on the position and the movement of the passenger (20) on the fairground ride.

6. The method according to claim 5, further comprising the following step:
detecting the stopping position of the vehicle (16) with an accuracy of 20 mm to 0.1 mm by means of the third position detection device (46).

7. The method according to claim 6, further comprising the following steps:
defining a stopping position of the vehicle (16) in the third section (30); and
moving the vehicle (16) within the third section such that the vehicle (16) occupies the stopping position with an accuracy of 20 mm to 0.1 mm.

8. The method according to claim 5, further comprising the following step:
depicting the virtual reality in the first section (12), in the second section (22) and/or in the third section (30) by means of an environment depiction generated in real time, by means of a depiction of the virtual reality precalculated as a video sequence or by means of a virtual reality generated in real time but depicted in connection with precalculated elements.

9. A computer program for executing the method according to claim 5, and/or for operating a fairground ride, wherein the computer program comprises program means for causing the VR apparatus (32) to execute the following steps when the computer program is executed on the VR apparatus (32), the program means including a non-transitory storage medium readable by a processor, the non-transitory storage medium having stored thereon a set of instructions for performing:
  detecting the position of the vehicle (16) on the travel route (14) by means of the first position detection device (38);
  detecting the position and movement of the passenger (20) in the second and third section (30) by means of the second position detection device (42);
  detecting the stopping position of the vehicle (16) in the third section (30) by means of the third position detection device (46);
  transmitting the detected positions, movement and stopping position to the VR apparatus (32); and
  generating and depicting the virtual reality corresponding to the journey of the passenger (20) with the vehicle (16) along the travel route (14) in the first section (12), the virtual reality corresponding to the position and movement of the passenger (20) in the second section (22), and the virtual reality corresponding to the entry and/or the exit of the passenger (20) in the third section (30) on the head-mounted display assigned to the passenger (20) depending on the position and the movement of the passenger (20) on the fairground ride.

10. The computer program according to claim 9, further comprising the following steps:
  automatically switching the position detection between the first position detection device (38), the second position detection device (42) and the third position detection device (46) depending on the position of the passenger (20) and/or the speed of the vehicle (16); or
  switching the position detection between the first position detection device (38), the second position detection device (42) and the third position detection device (46) after confirmation by an employee of the fairground ride (10).

* * * * *